(12) United States Patent
Xu et al.

(10) Patent No.: US 7,593,618 B2
(45) Date of Patent: Sep. 22, 2009

(54) IMAGE PROCESSING FOR ANALYZING VIDEO CONTENT

(75) Inventors: Li-Qun Xu, Ipswich (GB); Alan Hanjalic, Delft (NL)

(73) Assignee: British Telecommunications plc, London (GB)

( * ) Notice: Subject to any disclaimer, the term of this patent is extended or adjusted under 35 U.S.C. 154(b) by 1295 days.

(21) Appl. No.: 10/471,429

(22) PCT Filed: Mar. 15, 2002

(86) PCT No.: PCT/GB02/01222

§ 371 (c)(1),
(2), (4) Date: Sep. 11, 2003

(87) PCT Pub. No.: WO02/080027

PCT Pub. Date: Oct. 10, 2002

(65) Prior Publication Data

US 2004/0088289 A1 May 6, 2004

(30) Foreign Application Priority Data

Mar. 29, 2001 (EP) .................................. 01302949

(51) Int. Cl.
*H04N 5/93* (2006.01)
(52) U.S. Cl. ......................... 386/46; 715/723
(58) Field of Classification Search ............. 386/46, 386/52, 69; 375/240.26; 382/173; 715/723
See application file for complete search history.

(56) References Cited

U.S. PATENT DOCUMENTS

| 5,774,591 | A | 6/1998 | Black et al. |
| 5,987,414 | A * | 11/1999 | Sabourin et al. ............ 704/270 |
| 6,173,287 | B1 | 1/2001 | Eberman et al. |
| 6,549,643 | B1 * | 4/2003 | Toklu et al. .................. 382/107 |
| 6,956,904 | B2 * | 10/2005 | Cabasson et al. ........ 375/240.26 |
| 7,028,325 | B1 * | 4/2006 | Rui et al. ....................... 725/37 |
| 2002/0157116 | A1 * | 10/2002 | Jasinschi ..................... 725/136 |

FOREIGN PATENT DOCUMENTS

| EP | 0905981 A1 * | 3/1999 |
| EP | 1081604 A2 | 3/2001 |

OTHER PUBLICATIONS

Hong Jiang Z; Jianhua W; Di Z; Smoliar S W "An integrated system for content-based video retrieval and browsing", Pattern Recognition, Elsevier, Kidlington, GB—ISSN 0031-3203, vol. 30, Nr. 4, pp. 643-658.

Adjerok D A; Lee M C, "Adaptive transform domain video scene analysis", Multimedia Computing and Systems '97. Proceedings., IEEE International Conference on Ottawa, Ont., Canada Jun. 3-6, 1997, Los Alamitos, CA, USA,IEEE Comput. Soc, US—ISBN 0-8186-7819-4 , pp. 203-210.

(Continued)

*Primary Examiner*—David E Harvey
(74) *Attorney, Agent, or Firm*—Nixon & Vanderhye PC (57) ABSTRACT

A sequence of intensity measures is determined corresponding to each of a sequence of video frames. Such can be used for selection of videos according to user preferences and for providing highlights from a video sequence. Low level video characteristics are used which may be related to arousal and valence affects conveyed to a viewer while watching the video recording.

16 Claims, 7 Drawing Sheets

OTHER PUBLICATIONS

Koenen R; Pereira F, "MPEG-7: A standardised description of audiovisual content", Signal Processing. Image Communication, Elsevier Science Publishers, Amsterdam, NL—ISSN 0923-5965, vol. 16, Nr. 1-2, pp. 5-13.

Dimitrova N; McGee T; Elenbaas H, "Video keyframe extraction and filtering: a keyframe is not a keyframe to everyone", Proceedings of the 6th. International Conference on Information and Knowledge Management. CIKM '97. Las Vegas, Nov. 10-14, 1997, New York, ACM, US—ISBN 0-89791-970-X, vol. Conf. 6, pp. 113-120.

Hanjalic, A., Lagendijk, R.L., Biemond, J., "Automated High-Level Movie Segmentation for Advanced Video-Retrieval Systems", IEEE Transactions on Circuits and Systems for Video Technology, vol. 9, No. 4 (Jun. 1999), pp. 580-588.

McGee, T., Dimitrova, N., "Parsing TV programs for identification and removal of nonstory segments", Proceedings of IS&T/SPIE Storage and Retrieval for Image and Video Databases VII, vol. 3656, Jan. 1999, pp. 243-251.

Lang, A. Dhillon, P., Dong, Q: "The effects of emoltional arousal and valence on television viewers' cognitive capacity & memory", Journal of Broadcasting and Electronic Media, 39, pp. 313-327, 1995.

Lang, A., Newhagen, J., Reeves, B, "Negative Video as Structure: Emotion, attention, capacity, and memory", Journal of Broadcasting and Electronic Media, 40, pp. 460-477, 1996.

Adams, B., Dorai, C., Venkatesh, S., "Novel approach to determining tempo and dramatic story sections in motion pictures", Proceedings of ICIP 2000, Vancouver 2000, pp. 283-286.

Hanjalic, Alan et al., "Affective Video Content Representation and Modeling", IEEE Transactions on Multimedia, vol. 7, No. 1, Feb. 2005, pp. 143-154.

J. Nam, et al., "Dynamic Video Summarization and Visualization," Proceedings ACM Multimedia, pp. 53-56 (Oct. 30, 1999) XP002326442.

EPO communication pursuant to Article 96(2) EPC dated Feb. 1, 2007, in EP 02 718 279.9.

Office Action dated Apr. 8, 2008 in Canadian Patent Application No. 2,441,639.

* cited by examiner

IMAGE PROCESSING FOR ANALYZING VIDEO CONTENT

This application is the U.S. national phase of international application PCT/GB02/01222 filed 15 Mar. 2002 which designated the U.S.

BACKGROUND

1. Technical Field

The present invention relates to a method of analysing a sequence of video frames, the method being used particularly but not exclusively for selection of video recordings according to user preferences and for providing highlights from a video sequence.

2. Related Art

The number of digital video databases in both professional and consumer sectors is growing rapidly. These databases are characterised by a steadily increasing capacity and content variety. Since searching manually through terabytes of unorganised data is tedious and time-consuming, transferring search and retrieval tasks to automated systems becomes extremely important in order to be able to efficiently handle stored video.

Such automated systems rely upon algorithms for video content analysis, using models that relate certain signal properties of a video recording to the actual video content.

Due to the large number of possibilities of analysing a video recording, its content can be perceived in many different ways. Three different levels of video content perception are defined corresponding to three different techniques for analysing a video recording. These levels are known as the feature level, the cognitive level and the affective level.

Video analysis algorithms generally start at the feature level. Examples of features are how much red is in the image, or whether objects are moving within a sequence of images. Specifying a search task at this level is usually the simplest option (e.g. "Find me a video clip featuring a stationary camera and a red blob moving from left to right!").

At the cognitive level a user is searching for "facts". These facts can be, for example, a panorama of San Francisco, an outdoor or an indoor scene, a broadcast news report on a defined topic, a movie dialogue between particular actors or the parts of a basketball game showing fast breaks, steals and scores.

Specifying a search task at the cognitive level implies that a video analysis algorithm is capable of establishing complex relations among features and recognizing, for instance, real objects, persons, scenery and story contexts. Video analysis and retrieval at the cognitive level can be provided using advanced techniques in computer vision, artificial intelligence and speech recognition.

Most of the current worldwide research efforts in the field of video retrieval have so far been invested in improving analysis at the cognitive level.

Owing to the rapidly growing technological awareness of users, the availability of automated systems that can optimally prepare video data for easy access is important for commercial success of consumer-oriented multimedia databases. A user is likely to require more and more from his electronic infrastructure at home, for example personalised video delivery. Since video storage is likely to become a buffer for hundreds of channels reaching a home, an automated system could take into account the preferences of the user and filter the data accordingly. Consequently, developing reliable algorithms for matching user preferences to a particular video recording is desirable in order to enable such personalised video delivery.

In this description we define the affective content of a video recording as the type and amount of feeling or emotion contained in a video recording which is conveyed to a user. Video analysis at the affective level could provide for example, shots with happy people, a romantic film or the most exciting part of a video recording.

While cognitive level searching is one of the main requirements of professional applications (journalism, education, politics etc), other users at home are likely to be interested in searching for affective content rather than for "all the clips where a red aeroplane appears". For example finding photographs having a particular "mood" was the most frequent request of advertising customers in a study of image retrieval made with Kodak Picture Exchange. An user may want to search for the "funniest" or "most sentimental" fragments of a video recording, as well as for the "most exciting" segments of a video recording depicting a sport event. Also in the case of a complex and large TV broadcast such as the Olympic Games, the user is not able to watch everything so it is desirable to be able to extract highlights Extraction of the "most interesting" video clips and concatenation of them together in a "trailer"—is a particularly challenging task in the field of video content analysis. Movie-producers hope to achieve enormous financial profits by advertising their products—movies—using movie excerpts that last only for several tens of seconds but are capable of commanding the attention of a large number of potential cinemagoers. Similarly other categories of broadcasts, especially the sport events, advertise themselves among the TV viewers using the "most touching scenes in the sport arena" with the objective of selling their commercial blocks as profitably as possible. When creating the trailer, affective analysis of a video recording to be abstracted can provide the most important clues about which parts of a video recording are most suitable for being an element of it. Such a trailer can also be created remotely—directly at user's home.

However, known algorithms do not address video analysis at the third, affective level. Assuming that a "cognitive" analysis algorithm has been used to find all video clips in a database that show San Francisco, additional manual effort is required to filter the extracted set of clips and isolate those that radiate a specific feeling (e.g. "romantic") or those that the user simply "likes most".

BRIEF SUMMARY

This invention seeks to address the task of video analysis at the affective level. If video can be analysed at this level then it is possible to provide improved personalization of video delivery services, video retrieval applications at the affective level of content perception, and automation the video summarisation and highlighting processes.

Aspects of the invention are set forth in the claims.

BRIEF DESCRIPTION OF THE DRAWINGS

An embodiment of the invention will now be described with reference to the accompanying drawings in which.

DETAILED DESCRIPTION OF EXEMPLARY EMBODIMENTS

Firstly, in order to understand the invention a short description relating to "affect", used in this description to mean emotion or feeling, follows.

Affect may be defined using three basic underlying dimensions:

Valence (V)

Arousal (A)

Control (Dominance) (C)

Valence is typically characterised as a continuous range of affective responses extending from pleasant or "positive" to unpleasant or "negative". As such, valence denotes the "sign" of emotion. The dimension of arousal is characterised by a continuous response ranging from energised, excited and alert to calm, drowsy or peaceful. We can also say that arousal stands for the "intensity" of emotion. The third dimension—control (dominance)—is particularly useful in distinguishing between emotional states having similar arousal and valence (e.g. differentiating between "grief" and "rage") and typically ranges from "no control" to "full control". According to the model described above the entire range of human emotions can be represented as a set of points in the three dimensional VAC space.

Figure 1:
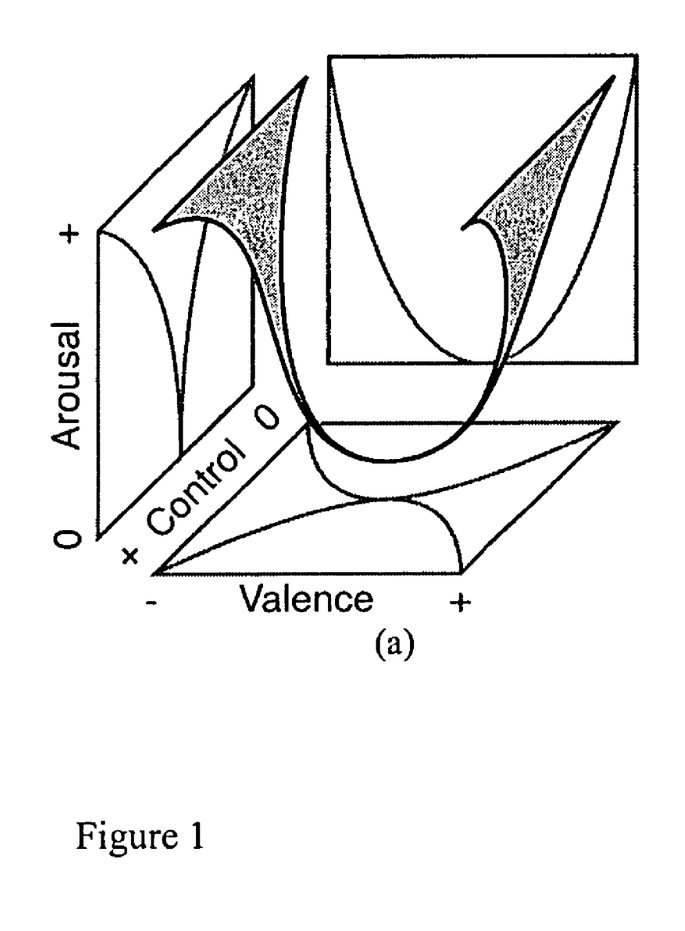
FIG. 1a is an Illustration of three dimensional valance, arousal and control space.

While it can theoretically be assumed that points corresponding to different affective (emotional) states are equally likely to be found anywhere in 3D VAC co-ordinate space, psychophysiological experiments have shown that only certain areas of this space are actually relevant. Measurement of affective responses of a large group of subjects to calibrated audio-visual stimuli show that subjects' affective responses to these stimuli (quantified by measuring physiological functions) are related to particular affect dimensions. For example, heart rate and facial electromyogram are reliable indicators of valence, whereas skin conductance is associated with arousal. The contour of the affective responses (that is, the surface in this space representing the possible (or valid) combinations of values in the individual dimensions, as determined by psychophysiological studies) after mapping onto the three dimensional VAC space was roughly parabolic, as shown in FIG. 1. This contour is said to define the three dimensional VAC emotion space. The characteristic shape of the three dimensional VAC emotion space is logical as there are few (if any) stimuli that would cause an emotional state characterised by, for instance, high arousal and neutral valence ("no screaming without reason!").

As can be seen from FIG. 1, the effect of the control dimension becomes visible only at points with distinctly high absolute valence values. This effect is also quite small, mainly due to a rather narrow range of values belonging to this dimension. Consequently, it can be said that the control dimension plays only a limited role in characterizing various emotional states. Probably for this reason, only few studies concern themselves with this dimension.

Figure 2:
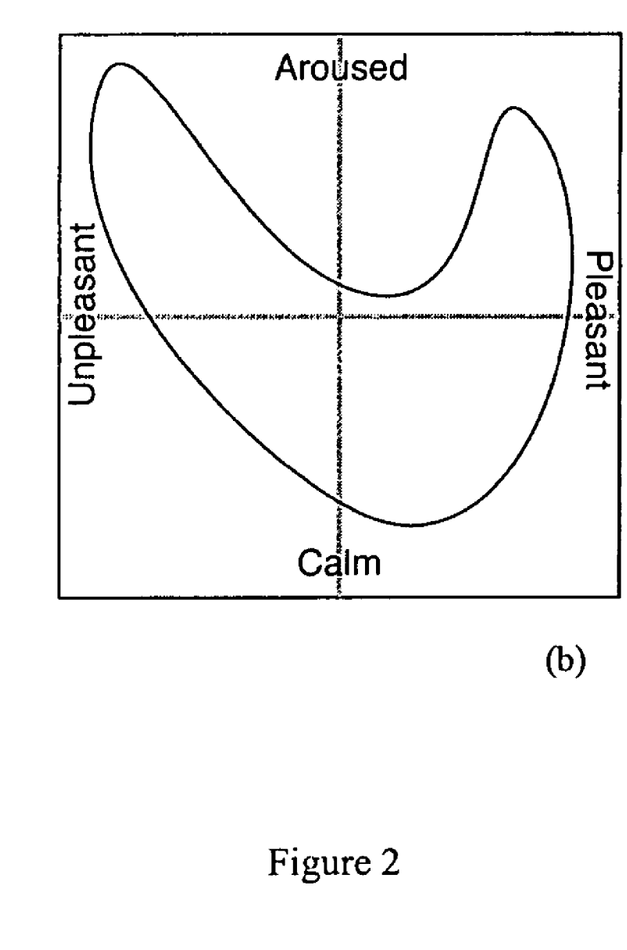
FIG. 2 is an illustration of two dimensional valence and arousal space.

Numerous studies of human emotional responses to media have shown that emotion elicited by pictures, television, radio, computers and sounds can be mapped onto an emotion space created by the arousal and valence axes. For this reason, in this invention the control dimension is ignored. Instead of the emotion space shown in FIG. 1, only the projection of that space onto two dimensional VA co-ordinate space is used. An illustration of this space is shown in FIG. 2.

Figure 3:
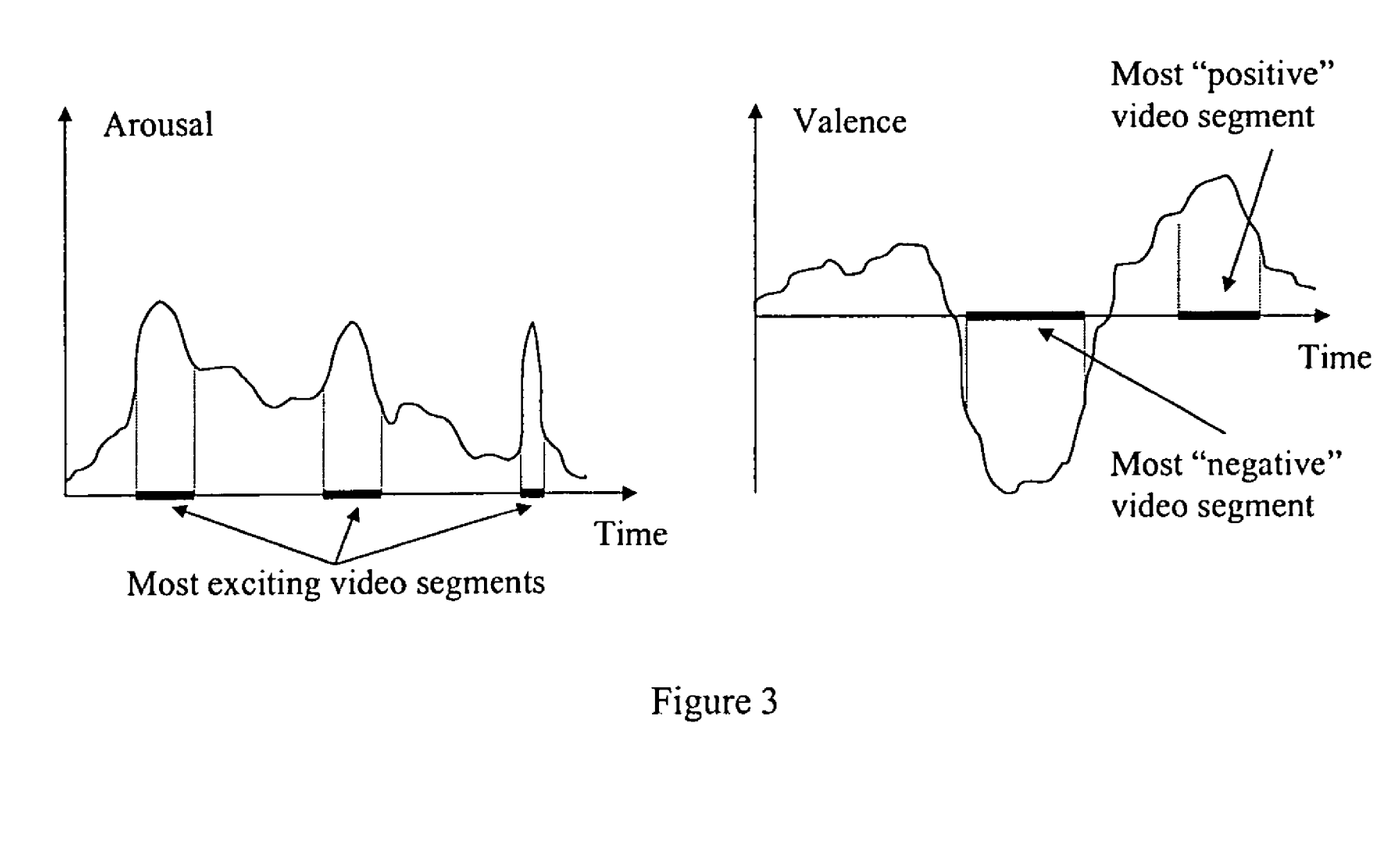
FIG. 3 is an illustration of the arousal and valence time curves.

Measuring the arousal and valence values in a video recording results in the arousal and valence time curves, as illustrated in FIG. 3. If treated separately, the arousal time curve may provide information about the positions of the "most exciting" video segments. Since the amount of excitement is the sole major criterion that determines user's interest in retrieving certain video genres (e.g. sport broadcasts), the arousal time curve can be considered as a fully sufficient characterization of the affective content in all programmes belonging to these genres. A good example of using the arousal curve for retrieval applications at the affective level is also illustrated in FIG. 3. Namely, the three segments of the arousal curve with highest arousal values can be joined together and used to create a clip showing, for instance, all goals of a soccer match or all highlights of the last Olympic Games.

The valence time curve can play a crucial role in filtering out the "positive" and "negative" video segments. As such, it can contribute to fitting a video recording to personal preferences of the user, but it can also be used for automatically performing "censorship" tasks, that is, extracting all "negative" segments and so preventing certain classes of database users from viewing them.

Figure 4:
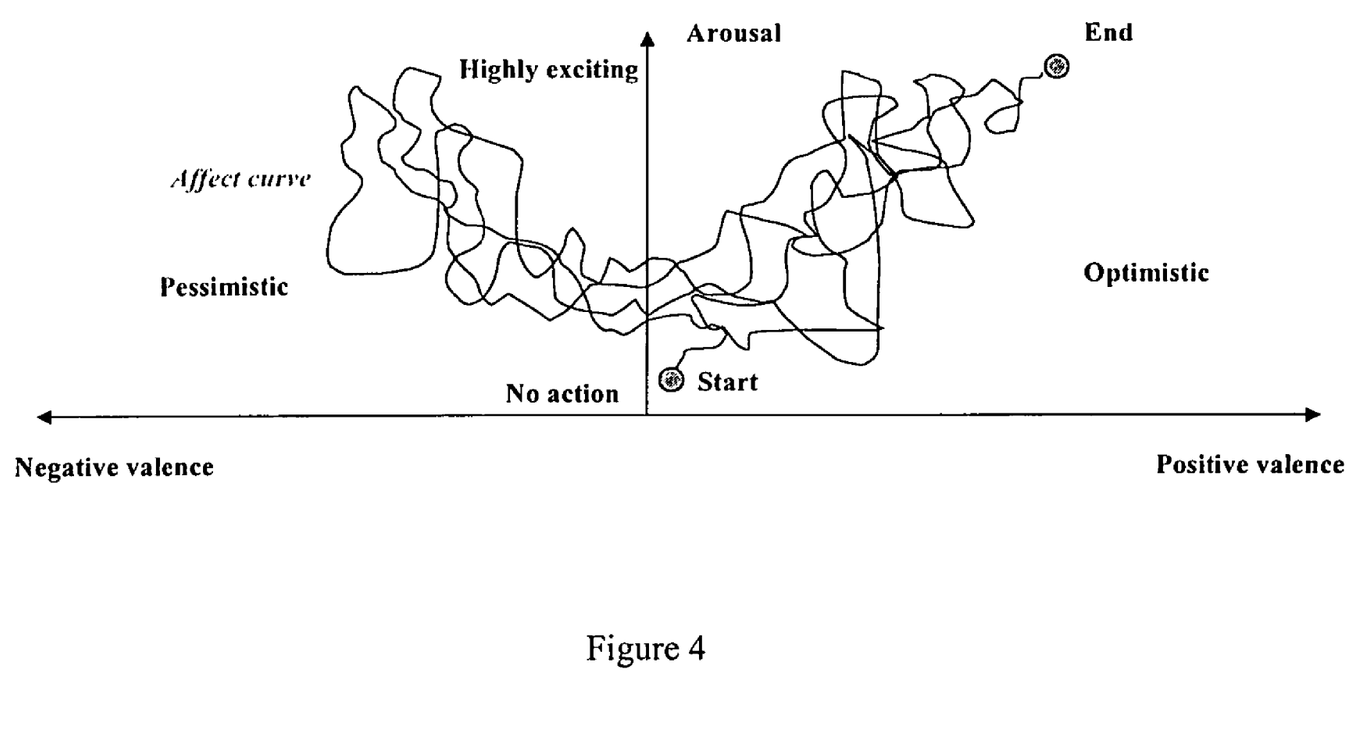
FIG. 4 is an illustration of an affect curve.

If an arousal time function is plotted against a valence time function, then an affect function is obtained, as illustrated in FIG. 4. The affect function provides a complete representation of the affective content of a video recording in two dimensional VA emotion space. For instance, the area of the coordinate system in which the curve "spends" most of the time corresponds to the prevailing affective state ("mood") of a video recording, and so can be used to characterize the entire video content as rather "pessimistic", "optimistic", "stationary/boring" or "dynamic/interesting". This can be useful for automatically classifying a video recording into different genres. Further, the affect function can be used directly as a criterion for selecting video recordings according to user preferences. An affect function representing user preferences can be obtained by simply combining the affect functions of all programmes that the user has selected in a learning phase.

Selecting a video recording according to user preferences is then simply a case of matching such a combined affect function with that of a particular video recording. The affect function can be used for extracting video segments that are characterised by a certain mood. Furthermore individual segments that are most suitable for being part of a movie trailer are those whose affect function passes through areas of "extreme emotions", that is, through the upper left and the upper right sector of the roughly parabolic two dimensional VA emotion space in FIG. 2.

An affect function needs to have the following properties in order to be useful in video analysis.

Comparability

Compatibility with VA emotion space

Smoothness

Continuity

Comparability ensures the suitability of an affect curve for the video retrieval applications. Where there is a requirement for preference-driven video filtering, an affect curve measured for one video recording has to be comparable with an affect curve measured for any other video recording.

Compatibility with the VA emotion space secures the quality of models used to obtain arousal and valence values in a video recording. These models can be considered useful only if the resulting affect curve covers an area the shape of which roughly corresponds to the parabolic-like contour of the VA emotion space illustrated in FIG. 2.

Smoothness and continuity are required due to inertia in human perception of a video recording and in human transition from one affective state to another. Smoothness accounts for the degree of memory retention of preceding frames and shots. The perception of the content, does not change abruptly from one video frame to another but is a function of a number of consecutive frames and shots. Continuity is based on the assumption that the affective state evoked in the user at different times in a video recording is not likely to change abruptly in time.

A description of an embodiment of the invention which provides an affect curve for a video recording which has the above properties now follows.

Signal properties of a video recording that may be extracted and which are often referred to as low-level features include,
a) colour distribution within a video frame or a frame region;
b) texture features (distribution of frequency coefficients in a textured region, wavelet coefficients, textural energy, contrast, coarseness, directionality, repetitiveness, complexity, auto-correlation, co-occurrence matrix, fractal dimension, auto-regressive models, stochastic models, edge distribution, shape/contour parameters and models, spatial relationships between lines, regions, objects, directional and topological relationships);
c) motion vectors for frame regions providing the motion intensity and motion direction; and
d) audio and speech features (pitch, frequency spectrum, zero-crossings, phonemes, sound/voice quality, inflection, rhythm, etc.).

In addition to this, the information acquired through analysis of editing effects, such as the frequency of shot changes, can be useful in detecting some aspects of video content. In the following we refer to low-level features such as those enumerated above, and shot-boundary changes, collectively as low-level video characteristics.

A number of psychophysiological studies have been performed concerning the effect of non-content (structural) attributes of film and television messages on the affective state of the user. These attributes include in general the screen size, viewing distance and the amount of chrominance in a picture (e.g. black & white versus colour picture). One of extensively investigated attributes is motion. Motion in a sequence of television pictures has a significant impact on individual affective responses. An increase of motion intensity on the screen causes an increase in arousal and in the magnitude of valence. The sign of valence is, however, independent of motion: if the feeling of a test person was positive or negative while watching a still picture, this feeling will not change if a motion is introduced within that picture.

Various characteristics of an audio and/or speech stream of a video programme provide valuable clues about the affective content of that programme. The pitch, loudness (signal energy), and speech rate (e.g. faster for fear or joy and slower for disgust or romance), for instance, are known to be directly related to the arousal and magnitude of valence. Also the inflection, rhythm, duration of the last syllable of a sentence and voice quality (e.g. breathy or resonant) are features that can be related to the sign of valence.

Pitch is related to the sign of valence. Pitch represents the fundamental frequency of voiced speech and is calculated by analysing a speech utterance. The fundamental frequency is the dominant frequency of the sound produced by the vocal cords. The pitch has a strong influence on how the listener perceives the speaker's intonation and stress. For example, pitch values will cover greater frequency range for happiness than for a "neutral" mood, while the frequency range will be smaller and a lower frequency than usual in the case of sadness.

Editing effects are useful to infer the values of some affective dimensions. The inventors have found the density of cuts (abrupt shot boundaries) to be a useful measure. Cuts are a popular tool for the director to either create the desired pace of action (e.g. in a movie) or to react to interesting events in live broadcasts (e.g. goals in a soccer game). The director deliberately chooses shorter shot lengths in movie segments he wishes to be perceived by the viewers as those with a high tempo of action development. By varying the cut density, a director controls the action dynamics and thus the viewer's attention. Therefore the varying cut density is related to the amount of arousal along a movie. In terms of the pace at which the video content is offered to a viewer, an increased shot-change rate has a similar effect on a viewer's arousal as an increase in overall motion activity. The relation between the cut density and arousal is even clearer when live broadcasts of sport events are considered. For example a soccer match is broadcast most of the time using one camera that covers the entire field and follows the game in one continuous shot.

However, whenever there is a goal, the director immediately increases the density of cuts trying to show everything that is happening on the field and among the spectators at that moment. This increase in cut density also appears whenever there is an important break (e.g. due to foul play, free kick, etc.). Any increase in cut density during such broadcast is a direct reaction of a director to an increase in the general arousal in the sport arena.

A method of generating an intensity measure corresponding to a measure of arousal using low level video characteristics will now be described with reference to the flow chart shown in FIG. 5.

At step 10 a video signal is received which comprises a sequence of frames. At step 11 a motion activity value is determined for each frame of the received signal. Motion activity is defined here as total motion in the picture, that is, as both motion of objects in a frame and camera motion. Motion activity m(k) is determined at the video frame k as the average of magnitudes of all motion vectors obtained by applying a block-based motion estimation procedure between frames k and k+1, normalised by the maximum possible length of a motion vector, that is $$m(k) = \frac{100}{B \max_{i=1,\ldots,B}(|v_i(k)|)} \left(\sum_{j=1}^{B} |v_j(k)|\right) \% \quad (1)$$

In equation (1), B is the number of blocks within a frame and $v_i(k)$ is the motion vector obtained for the block i of the frame k.

The motion vectors can be estimated using standard block matching based techniques described for example in "Digital Video Processing" by A. Murat Tekalp, Prentice Hall Publisher, 1995.

In this embodiment of the invention a frame k of a video recording is divided into blocks of size 32 by 32 pixels. For each block of an image this block is compared with a block of the same size in frame k−1, displaced by up to 9 pixels horizontally and vertically. The displaced block in frame k−1 which is most similar to the block in frame k provides the motion vector $v_i(k)$.

The maximum possible length of the motion vector is therefore $\sqrt{9^2+9^2}$.

Figure 6A:
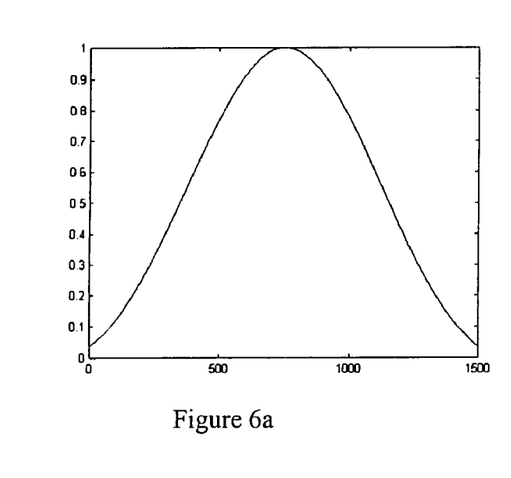
FIG. 6a illustrates a Kaiser window of the length 1500 and shape parameter 5.

However, the motion activity curve obtained by computing the values m(k) according to Equation (1) in a video recording is not directly suitable for being included into the model for arousal. On the one hand, the value may strongly fluctuate within a shot and, on the other hand, it may fluctuate in different ranges for two consecutive shots (e.g. total motion activity within a close-up shot is much larger than that in a shot taken from a large distance). Since these sudden changes do not comply with the desired properties of smoothness and continuity, as defined in the previous section, m(k) is convolved using a Kaiser window at step 13. This time window is shown in FIG. 6*a*. In this embodiment of the invention it has the length 1500 video frames (i.e., at 25 frames/second, 60 seconds) and a shape parameter of 5. In the this embodiment of the invention the shape parameter affects the sidelobe attenuation of the Fourier transform of the window.

Figure 6B:
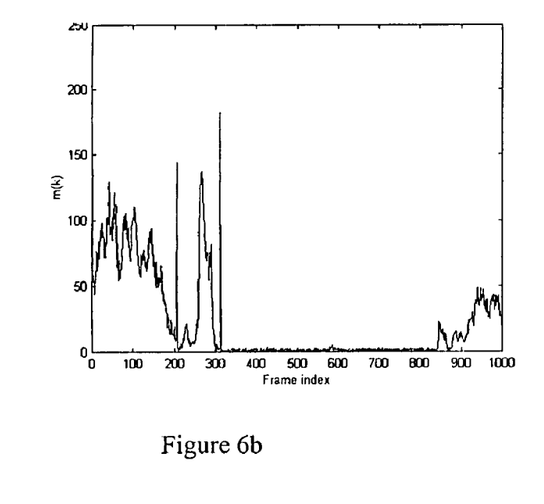
FIG. 6b illustrates motion activity.
Figure 6C:
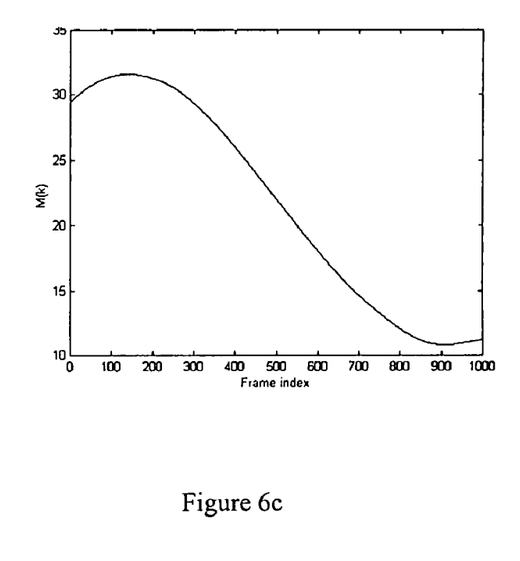
FIG. 6c illustrates filtered motion activity.

The effect of this convolution is illustrated using the motion activity curve shown in FIG. 6*b*. The result of convolution is shown in FIG. 6*c* and calculated as $$M(k) = \frac{\max_k(m(k))}{\max_k(K(l, \beta)^*m(k))}(K(l, \beta)^*m(k)) \ \% \quad (2)$$

where K(l, β) is the Kaiser window, l is the window length and β is the shape parameter. "*" is the convolution operator. The motion activity curve resulting from the convolution process is much more likely to depict viewer's arousal changes Scaling the windowed motion activity curve, as indicated by the fraction in equation (2), serves to ensure that the function M(k) remains in the same range as the function m(k). As it can be seen from equation (2), the range is adjusted such that the maximum of the function M(k) remains the same as for the function m(k). Other values of the convolved signal are then scaled correspondingly. This explains slight differences in ranges of the curves in FIGS. 6*b* and 6*c*, which are only segments of the entire m(k) and M(k) curves.

At step 16 an audio signal is received which corresponds to the video signal received at step 10. It will be appreciated that whilst these steps are illustrated separately in FIG. 5, in a practical system these signals will be received simultaneously. Firstly the number s of audio samples that cover the same time period as one video frame is determined. If f is the frame rate of a video recording (normally 25 to 30 frames per second) and F the audio sampling frequency (typically 44.1 kHz for CD quality), then s is obtained as $$s = \frac{F}{f} \quad (3)$$

The power spectrum for each consecutive segment of the audio signal containing s samples is determined at step 17. At step 18 the sound energy value $e_{high}(k)$ is then determined by summing all spectral values starting from a pre-defined cut-off frequency C. In this embodiment of the invention the cut off frequency is set to 700 Hz.

At step 19 a Kaiser window is used to smooth the curve $e_{high}(k)$. Abrupt peaks in the function $e_{high}(k)$ imply that the arousal component related to sound energy can change greatly from one frame to another. Since this is not the case, the signal is filtered using a Kaiser window of length 1000 with a shape parameter equal to 5. Further, the result of the convolution procedure is normalised in order to make the sound energy values independent of average sound volume used in a video recording. This is important in order to compare arousal functions of video recordings that are taken under different conditions. The normalisation is performed by first normalizing the convolved curve by its maximum and then by multiplying it with the ratio of the maximum of the $e_{high}(k)$ curve and the maximum of the curve $e_{total}(k)$ of the total energy contained in s samples. The equation for the sound energy in higher frequencies that serves as the second component of the arousal model is given as $$E(k) = \frac{100\max_k(e_{high}(k))}{\max_k(e_{total}(k))\max_k(K(l, \beta)^*e_{high}(k))}(K(l, \beta)^*e_{high}(k)) \ \% \quad (4)$$

At step 12 a cut density value is calculated for each frame. Similarly to the first two features a function of the frame index k is used that shows a relationship between a viewer's arousal and the time-varying density of cuts.

There are various cuts detection methods available for example as described in Zhang, H. J., A. Kankanhalli, and S. Smoliar, Automatic partitioning of video. Multimedia Systems 1(1): 10-28. Cuts are normally determined by measuring changes in visual scene content in a video stream. When the variation is above certain threshold then a cut is detected.

In this embodiment of the invention changes in the visual scene content are measured using a block based histogram. The frame is divided into nine blocks, for each block a histogram is calculated in three (R, G, B) colour bands, then histograms for corresponding blocks in consecutive frames are compared to calculate the variation.

Function c(k) is defined as $$c(k) = \frac{100}{c_{next}(k) - c_{previous}(k)} \ \% \quad (5)$$

Figure 7A:
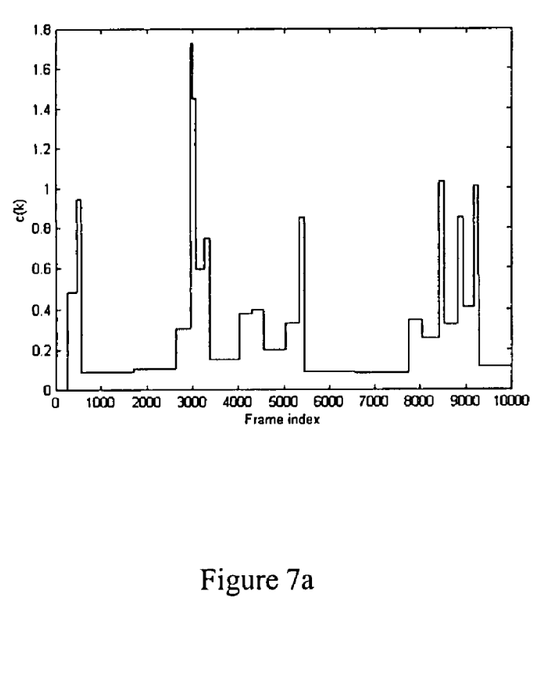
FIG. 7a illustrates a cut frequency function.
Figure 7B:
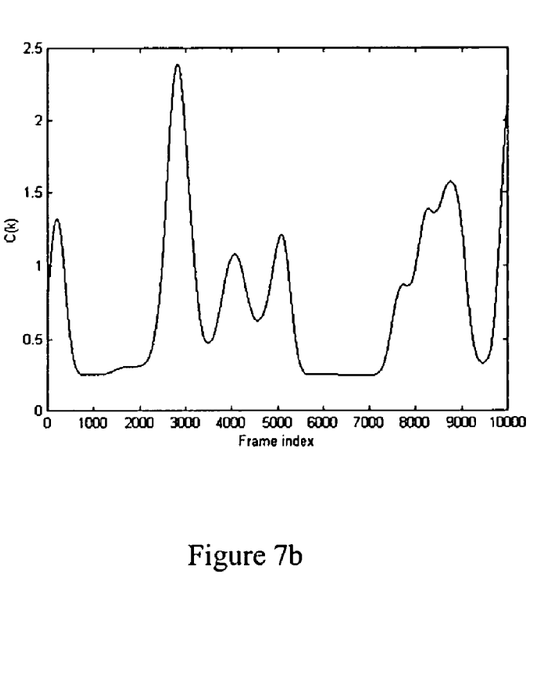
FIG. 7b illustrates the cut frequency function of FIG. 7a after filtering.

Here, $c_{previous}(k)$ and $c_{next}(k)$ are the frame number of closest cuts before and after the frame k respectively. FIG. 7*a* shows a typical function c(k) that is characterised by vertical edges at places of cuts. Due to incompatibility between vertical edges of c(k) and the viewer's arousal that is characterised by inertia, function c(k) is filtered at step 14 using a suitable Kaiser window. In this case a window of length 1000 and a shape parameter equal to 10 is used. FIG. 7*b* shows the result of the filtering. The analytical description of the convolution result is the function c(k) being the third feature of the arousal model:

$$C(k) = \frac{\max_k(c(k))}{\max_k(K(l, \beta)^*c(k))}(K(l, \beta)^*c(k)) \%  \quad (6)$$

As indicated in equation (6) the function C(k) is scaled to occupy the same range as the function c(k).

Using the three features defined in equations (2, 4 and 6) an intensity measure A(k) is calculated at step 15 as the weighted average of these components, that is $$A(k) = \frac{\alpha_M M(k) + \alpha_E E(k) + \alpha_C C(k)}{\alpha_M + \alpha_E + \alpha_C} \% \quad (7)$$

In this embodiment of the invention, values of 1, 1 and 10 are used for weighting factors $\alpha_M$, $\alpha_E$ and $\alpha_C$ respectively. Since each of the three components contributing to the intensity function is compliant with the properties of smoothness, continuity and compatibility, the resulting intensity function complies with these properties as well.

It will be appreciated that other weighting factors may be used, including a weighting factor of zero, which effectively means that that feature is not taken into account when combining the intensity values at step 10.

The most exciting parts of a video recording are those which have a high intensity measure, so frames having an intensity measure greater than a predetermined threshold may be selected to form a sequence of highlights from a film. Alternatively the most exciting frames may be selected in order to provide a sequence of predetermined length.

In this embodiment of the invention one low-level feature, pitch, is used to provide a measure of valence in a video recording. Using this feature both the magnitude and the sign of valence are estimated.

Figure 8A:
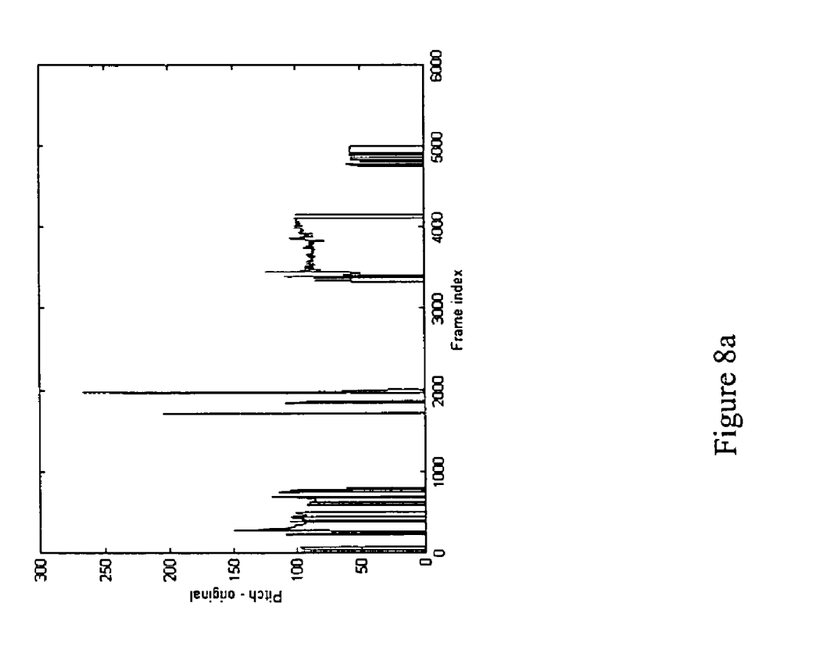
FIG. 8a illustrates pitch measured in a sequence of 5000 frames.

FIG. 8a shows the pitch signal measured for a segment of a video recording. It can be seen that pitch values are obtained only at certain points—those where speech or other sounds is voiced. In this embodiment of the invention a pitch detector is used to provided a pitch estimate for the audio signal received at step 16. An example of a suitable pitch detector may be found in Speech and Audio Signal Processing: Processing and Perception of Speech and Music by Nelson Morgan, Ben Gold, John Wiley & Sons 1999.

Pitch estimates that are within the range from 50 to 220 Hz are selected in order to remove the influence of signals other than voice which also occur in a video recording. The pitch detector may have falsely recognised these other signals (music, noise) as voiced speech. However, we assume that the incorrect pitch estimates are positioned beyond the usual pitch range for male speakers, typically from 80 to 200 Hz. This pitch range may need to be increased to include female and children's speech.

In carrying out pitch analysis, we use a time window of 25 ms long (covering ~1000 samples) to compute one pitch point for this short segment, this window then shifts by 5 ms along the time course, we compute a second pitch point, . . . , and so on. In correspondence with the video frame interval of 40 ms, we then have 8 pitch points. In the end we decide to take the median of these 8 pitch points to give only one pitch output for every 40 ms long video frame. Where pitch information is absent, an interpolated value is used. All pitch values in a segment h of length L (e.g. 800) video frames that are selected in the previous step are averaged and the average is used as the pitch value $p_h$ for the entire segment h. Once these pitch values have been determined at step 21 of FIG. 5 the pitch values are shifted at step 24 to provide positive and negative values as follows.

Each pitch segment h with its pitch value $p_h$ now corresponds to one segment of a video sequence containing L frames. So, each frame k belonging to one video segment gets assigned the pitch value $p_h$ of the corresponding pitch segment.

Figure 8B:
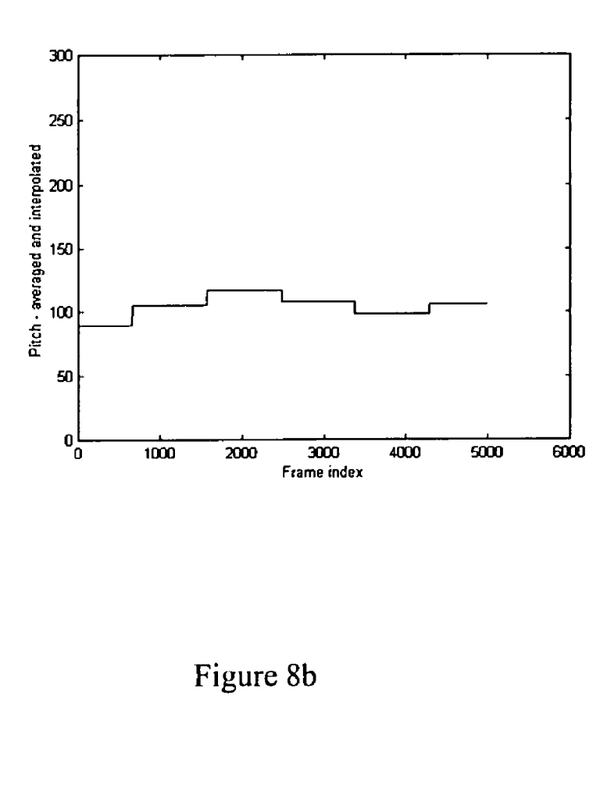
FIG. 8b illustrates averaged and interpolated pitch values within sequence segments.

Performing this procedure along all video segments results in a function P(k) as shown in FIG. 8b (where the horizontal axis represents the number of video frames). This function can be represented as $$P(k)=p_{h,k} \text{ with } \{p_{h,k}|p_{h,k}=p_h\hat{} k \in L_h\} \quad (8)$$

Here, $L_h$ is the video segment that corresponds to the pitch segment h. Valence is now defined as $$v(k)=P(k)-N \quad (9)$$

where N is a predetermined "neutral feeling" frequency. Since each segment is now characterised by a single (the average) pitch value, as depicted in FIG. 8b, it can be said that if this value is below a reference frequency N, the pervasive mood in the segment is presumably rather sombre, in contrast with a relaxed and happy mood when the average pitch value is above this reference frequency. Then, if the average pitch value per segment is below a certain reference frequency N, the mood in that segment is assumed as rather sombre, as opposed to a relaxed and happy mood if the average pitch is above this predetermined frequency.

The valence function is filtered (step 22) using a suitable Kaiser window. Here we choose the window length 2000 and shape parameter 5. The result of this convolution denoted $\tilde{v}_k$ between the function (9) and the Kaiser window selected provides the final valence function, calculated (in step 23, FIG. 5) as $$V(k) = \frac{\max_k(v_k) - \min_k(v_k)}{\max_k(\tilde{v}_k - \min_k(\tilde{v}_k))}\left(\tilde{v}_k - \min_k(\tilde{v}_k)\right) + \min_k(v_k) \quad (10)$$

Equation (10) describes that the normalised value V(k) ranges between $$\min_k(v_k) \text{ and } \max_k(v_k).$$

Note that the denominator is a constant, as well as the nominator, with regard to all the frame values that k can assume.

It will be appreciated that the shifting step 24 could be done after filtering step 22 and indeed could be done in conjunction with step 23.

Equations 10 and 7 can then be plotted against one another so as to provide a VA function such as that shown in FIG. 4. Each area of the VA space corresponds to a particular "mood" in the video recording.

Naturally such a graphical representation does not lend itself to direct automatic comparison. Therefore an "affect map" approach is proposed, whereby, instead of the graphical plot, a map or vector, characterising the particular video recording, is generated. If the VA space (that is, the area of the graph in FIG. 4) is divided into rectangular areas, then the number of video frames having a combination of A and V falling into each rectangle can be counted, giving a set of values. For example if the space is divided into three ranges vertically and six ranges horizontally then there would be eighteen squares and hence the affect map is 8×10 matrix (or an eighty-element vector). A finer or coarser division may be chosen if desired, and the division may be linear or non-linear.

Assuming a linear 8×10 division, and supposing that the map is a matrix W(i,j) (all elements of which are initially zero) then the procedure for each video frame, where the total number of frames is $N_F$, is as follows:
a) quantise A to an integer A' in the range 0 to 7;
b) quantise V to an integer V' in the range 0 to 9;
c) increment element W(A',V') of W.

Once this has been done for all frames, then each element of W contains a frame count: each of these is then normalised by division by $N_F$—i.e.

$$W'(i,j)=W(i,j)/N_F \text{ for } i=0\ldots 7, j=0\ldots 9.$$

Figure 5:
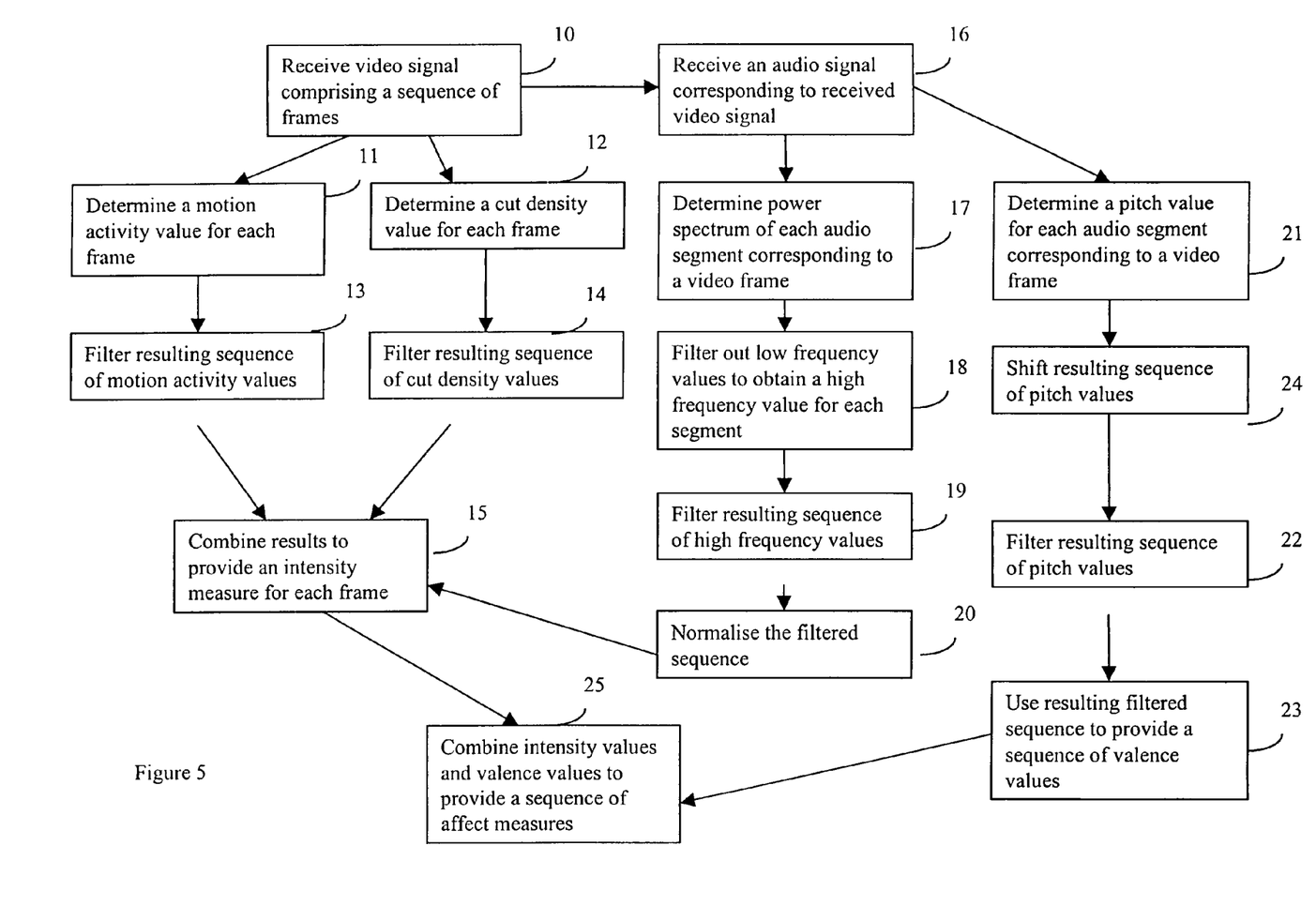
FIG. 5 is a flowchart illustrating a series of method steps according to the invention.

This describes how to construct the map for one video recording—denoted in FIG. 5 as combination step 25. In order however to make use of the map for selection of classification purposes, then generic maps may be constructed. For instance, if examples are available of video recordings which have already been classified manually, then the average of the maps for these example recordings can be formed. An unknown recording can then be analysed to obtain its affect map, and this map compared with a number of generic maps: the new recording is then assigned the classification associated with the closest matching generic map.

For selection or recommendation of further recordings for a viewer whose viewing history is known, a generic "preference map" can be constructed for that person, being the average of the individual maps for the video recordings he has chosen previously. New recordings can then each be analysed and their maps compared with the preference map and the one (or more) having the best match can be chosen.

For comparing two maps, a distance measure could easily be generated by summing the absolute differences between the individual elements of the maps e.g.

$$D = \sum_{i=0}^{7} \sum_{j=0}^{9} |W(i,j) - W_g(i,j)| \quad (11)$$

(here $W_g$ is the generic map); the pair having the smallest distance D represent the closest match.

Other distance measures could be used; or, in a more sophisticated approach a model could be trained to make the comparisons.

In this embodiment of the invention a Kaiser window has been used throughout. In other embodiments of the invention other appropriate symmetric windows such as Hamming, Hanning, Blackman window can also be used. Since convolution in the time domain is equivalent to multiplication in the frequency domain then this convolution operation is equivalent to a filtering operation to remove high frequencies.

As will be understood by those skilled in the art, the method of this invention may be implemented in software running on a conventional computer such as a personal computer. Such software can be contained on various transmission and/or storage mediums such as a floppy disc, CD-ROM, or magnetic tape so that the software can be loaded onto one or more general purpose computers or could be downloaded over a computer network using a suitable transmission medium.

Finally, although reference has been made throughout this description to video recordings, it will be understood that the methods described can be applied to other media, for example a cine film, provided that it is firstly converted into a video signal.

What is claimed is:

1. An automated method of determining a sequence of intensity measures, each intensity measure corresponding to each of a sequence of recorded video frames, the method comprising using a programmed computer to:
   determine a motion activity measure for each video frame of said sequence to provide a sequence of motion measures;
   filter the sequence of motion activity measures;
   provide a sequence of intensity measures using said filtered sequence of motion activity measures;
   determine a measure of cut frequency to provide a sequence of cut frequency measures;
   filter the sequence of cut frequency measures; and
   combine the filtered measures to provide said sequence of intensity measures.

2. An automated method according to claim 1, in which the recorded video frames have an associated audio track and further comprising using said computer to:
   determine a measure of sound energy in high frequencies for the audio track to provide a sequence of high frequency measures;
   filter the sequence of sound energy measures;
   normalize the filtered sequence of sound energy measures; and
   combine the normalized sequence of sound energy measures with the filtered measures to provide said sequence of intensity measures.

3. An automated method according to claim 1, which also forms an affect measure for a sequence of recorded video frames having an associated audio track, by further comprising use of said computer to:
   determine a pitch measurement for the audio track to provide a sequence of pitch measures;
   filter the sequence of pitch measures;
   provide a sequence of valence measures using said filtered sequence of pitch measures; and
   combine the sequence of valence measures with the sequence of intensity measures to provide a sequence of affect measures.

4. An automated method of selecting frames from a sequence of recorded video frames comprising using said computer to determine a sequence of intensity measures corresponding to each of the sequence of video frames using the method according to claim 1, and selecting frames from the sequence of video frames for which the intensity measure is greater than a predetermined threshold.

5. An automated method of selecting frames from a sequence of recorded video frames comprising using said computer to determine a sequence of intensity measures corresponding to each of the sequence of video frames using the method according to claim 1, and in which the threshold is determined to select a predetermined number of frames.

6. An automated method according to claim 3, in which the affect measure is generated by using said computer to:
   define ranges of the intensity measures and valence measures; and
   count for respective combinations of intensity range and valence range the number of video frames whose measures fall into the respective range combination, to produce a multi-element affect measure.

7. An automated method according to claim 6, in which the counts are normalized by division by the number of frames in the video sequence.

8. An automated method according to claim 6, including forming a generic affect measure by combining the affect measures obtained for a plurality of video frame sequences.

9. An automated method according to claim 6, including the step of comparing an affect measure obtained for one sequence of video frames with the affect measure obtained for other video sequences.

10. An automated method of forming an affect measure for a sequence of recorded video frames having an associated audio track, said method comprising using a programmed computer to:

determine a sequence of intensity measures using a method according to claim 2;

determine a pitch measurement for the audio track to provide a sequence of pitch measures;

filter the sequence of pitch measures;

provide a sequence of valence measures using said filtered sequence of pitch measures; and combine the sequence of valence measures with the sequence of intensity measures to provide a sequence of affect measures.

11. An automated method of generating an affect measure for a sequence of recorded video frames having an accompanying sound track, said method comprising using a programmed computer to:

(a) generate a sequence of intensity measures for the frames of the sequence, said intensity measures depending on the degree of visual activity in the sequence;

(b) generate a sequence of valence measures for the frames of the sequence, said valence measures depending on the pitch of the sound track;

(c) define ranges of the intensity measures and valence measures; and (d) count for respective combinations of intensity range and valence range the number of video frames whose measures fall into the respective range combination, to produce a multi-element affect measure.

12. An automated method according to claim 11, in which the counts are normalized by division by the number of frames in the recorded video sequence.

13. An automated method according to claim 11, including forming a generic affect measure by combining the affect measures obtained for a plurality of recorded video frame sequences.

14. An automated method according to claim 11, including the step of comparing an affect measure obtained for one sequence of video frames with the affect measure obtained for other recorded video sequences.

15. An automated method of determining a sequence of intensity measures, each intensity measure corresponding to each of a sequence of recorded video frames having an associated audio track, the method comprising using a programmed computer to:

determine a motion activity measure for each frame of said sequence to provide a sequence of motion measures;

filter the sequence of motion activity measures;

provide the sequence of intensity measures using said filtered sequence of motion activity measures;

determine a measure of sound energy in high frequencies for the audio track to provide a sequence of high frequency measures;

filter the sequence of sound energy measures;

normalize the filtered sequence of sound energy measures; and combine the normalized sequence of sound energy measures with the filtered measures to provide said sequence of intensity measures.

16. An automated method of determining a sequence of intensity measures, each intensity measure corresponding to each of a sequence of recorded video frames having an associated audio track and then forming an affect measure for a sequence of said video frames, said method comprising using a programmed computer to:

determine a motion activity measure for each frame of said sequence to provide a sequence of motion measures;

filter the sequence of motion activity measures;

provide the sequence of intensity measures using said filtered sequence of motion activity measures;

determine a pitch measurement for the audio track to provide a sequence of pitch measures;

filter the sequence of pitch measures;

provide a sequence of valence measures using said filtered sequence of pitch measures; and combine the sequence of valence measures with the sequence of intensity measures to provide a sequence of affect measures.

* * * * *